(12) United States Patent
Gadkaree

(10) Patent No.: US 6,187,713 B1
(45) Date of Patent: Feb. 13, 2001

(54) METHOD OF MAKING ACTIVATED CARBON BODIES HAVING IMPROVED ADSORPTION PROPERTIES

(75) Inventor: Kishor P. Gadkaree, Big Flats, NY (US)

(73) Assignee: Corning Incorporated, Corning, NY (US)

(*) Notice: Under 35 U.S.C. 154(b), the term of this patent shall be extended for 0 days.

(21) Appl. No.: 09/231,860

(22) Filed: Jan. 14, 1999

Related U.S. Application Data

(63) Continuation-in-part of application No. 08/741,840, filed on Oct. 31, 1996, now abandoned.

(51) Int. Cl.$^7$ .................................................. C01B 31/12
(52) U.S. Cl. ............................................. 502/425; 502/423
(58) Field of Search ................................. 502/416, 423, 502/427, 439, 425; 423/445 R

(56) References Cited

U.S. PATENT DOCUMENTS

| | | |
|---|---|---|
| 4,024,076 | 5/1977 | Miyake et al. . |
| 4,072,479 * | 2/1978 | Sinha et al. ............................ 95/136 |
| 4,286,972 | 9/1981 | Savage et al. . |
| 4,758,272 | 7/1988 | Pierotti et al. . |
| 4,992,233 | 2/1991 | Swaroop et al. . |
| 5,451,444 | 9/1995 | DeLiso et al. . |
| 5,488,023 * | 1/1996 | Gadkoree et al. .................... 502/182 |
| 5,639,707 * | 6/1997 | Lewis et al. .......................... 502/423 |

FOREIGN PATENT DOCUMENTS

| | | |
|---|---|---|
| 33 39 756 A1 | 5/1985 | (DE) . |
| 0 264 523 | 12/1988 | (EP) . |
| 0 488 716 A1 | 6/1992 | (EP) . |
| 0 608 539 A1 | 8/1994 | (EP) . |
| 5-038414 | 2/1993 | (JP) . |

OTHER PUBLICATIONS

U.S. application No. 08/395,224; filed Feb. 27, 1995.
JP 5921513 A, Chemical Abstracts, vol.100, No. 20, May 14, 1984, p. 136, col. 1.

* cited by examiner

*Primary Examiner*—Tom Dunn
*Assistant Examiner*—Stuart L. Hendrickson
(74) *Attorney, Agent, or Firm*—L. Rita Herzfeld; Anca C. Gheorghiu

(57) ABSTRACT

An activated carbon body and method of making the body which involves providing an inorganic substrate, thermosetting resin, and an adsorption enhancing additive which can be sulfur and/or oil which is non-miscible with and non-reactive with the carbon precursor, contacting the inorganic substrate with the carbon precursor and the adsorption enhancing additive to coat the substrate therewith, curing and carbonizing the carbon precursor, and activating the carbon to produce a coating of activated carbon on the substrate and form the activated carbon body. Another method involves forming a mixture of thermosetting resin, adsorption enhancing additive, which can be sulfur, phosphoric acid, and/or the oil, temporary organic binder, optional forming aid, and fillers, shaping the mixture into a body, followed by curing, carbonizing, and activating to produce a shaped body of activated carbon. When sulfur is utilized, a sulfur-carbon bond forms that is characterized by a peak at 165.9 eV when analyzed by Electron Spectroscopy for Chemical Analysis.

13 Claims, 2 Drawing Sheets

METHOD OF MAKING ACTIVATED CARBON BODIES HAVING IMPROVED ADSORPTION PROPERTIES

This is a continuation-in-part of abandoned patent application Ser. No. 08/741,840 filed Oct. 31, 1996.

This invention relates to activated carbon with improved adsorption properties. The activated carbon is derived from synthetic carbon precursors and the improved adsorption is due to the inclusion of an additive or modifier for the precursor to enhance the adsorption properties of the carbon precursor.

BACKGROUND OF THE INVENTION

Activated carbon is utilized in many industrial applications for process stream purifications as well as pollution control.

Activated carbon can take the form of a shaped body, or a coating on a substrate, or as granules.

One method of making activated carbon is to carbonize a carbon precursor such as a synthetic resin, followed by activation.

Activated carbon coated inorganic honeycombs have been discussed in U.S. Pat. No. 5,451,444. The cordierite honeycombs are coated with a synthetic polymeric precursor to carbon. The polymer infiltrates the porous honeycomb and forms an interpenetrating network structure.

Thermosetting synthetic resins are preferred because of low cost and water solubility. The activated carbon coated honeycombs obtained by carbonizing and activating the carbon coat on the cordierite honeycombs have high adsorption capacity, high strengths, and ability to perform at high temperatures.

The present invention provides an activated carbon product with improved adsorption properties.

SUMMARY OF THE INVENTION

In accordance with one aspect of the invention, there is provided a method of making an activated carbon body which involves providing an inorganic substrate, a thermosetting resin, and an adsorption enhancing additive which can be sulfur and/or oil which is non-miscible with and non-reactive with the carbon precursor, contacting the inorganic substrate with the carbon precursor and the adsorption enhancing additive to coat the substrate therewith, curing and carbonizing the carbon precursor, and activating the carbon, to produce a coating of activated carbon on the substrate and form the activated carbon body.

In accordance with another aspect of the invention, there is provided a method for making an activated carbon body which involves forming a mixture of thermosetting resin, adsorption enhancing additive, which can be sulfur, phosphoric acid, and/or the oil, temporary organic binder, optional forming aid, and fillers, shaping the mixture into a body, followed by curing, carbonizing, and activating to produce a shaped body of activated carbon.

In accordance with another aspect of the invention, there is provided activated carbon bodies made by the above-described methods. When sulfur is utilized, there is formed a carbon-sulfur bond that is characterized by a peak at 165.9 eV when analyzed by Electron Spectroscopy for Chemical Analysis.

DETAILED DESCRIPTION OF THE INVENTION

Figure 1:
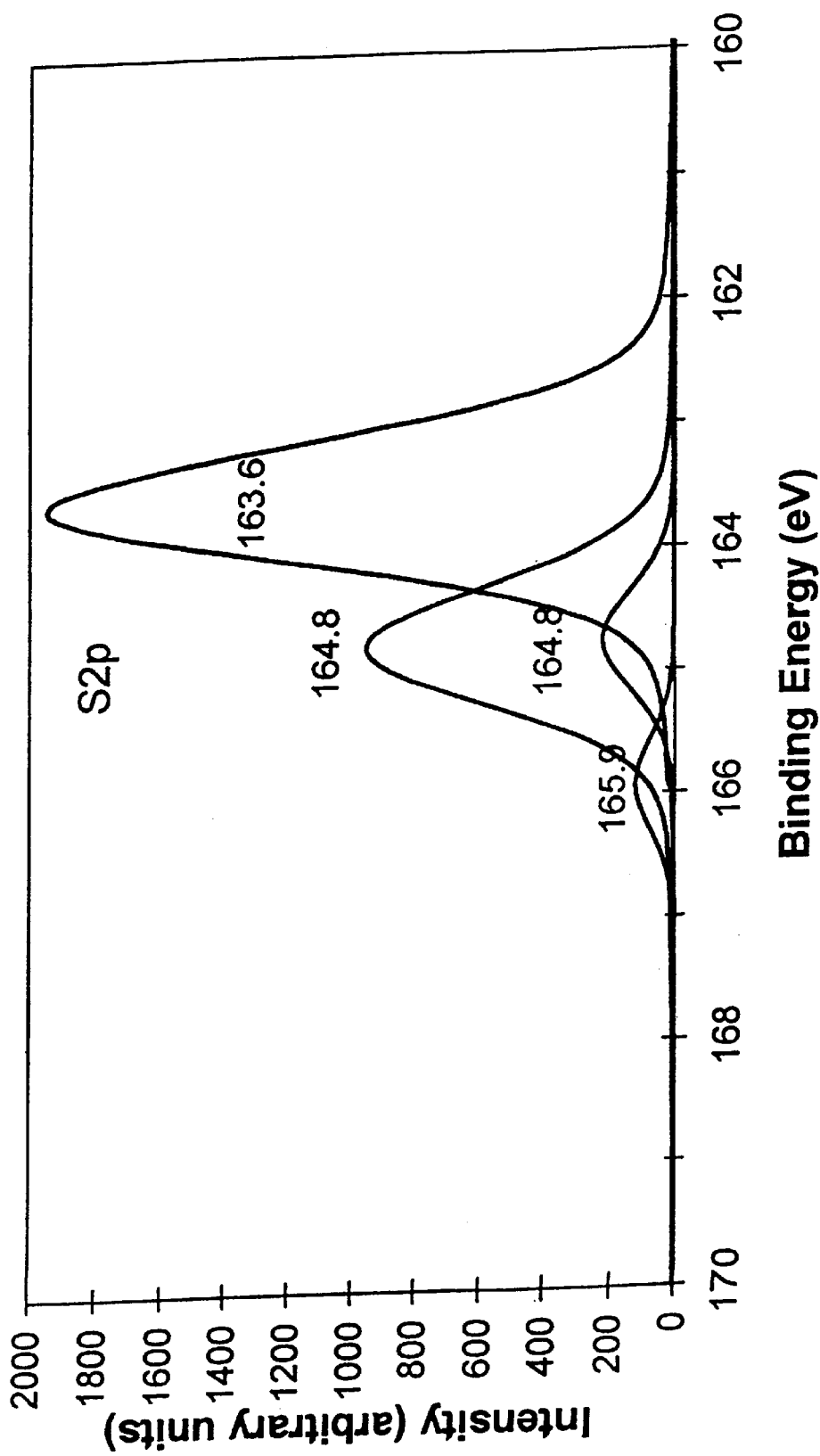
FIG. 1 is a plot depicting ESCA data for an inventive example.

This invention relates to making activated carbon having improved adsorption ability. These advantages are afforded by making activated carbon from a synthetic, non-polycyclic aromatic carbon precursor, a thermosetting resin, which is first treated with an additive, modifier or agent that ultimately enhances adsorption properties of the activated carbon product, and thereafter cured, carbonized, and activated.

The activated carbon can take the form of a coating on a substrate, or a shaped monolithic structure of activated carbon formed from a mixture which includes the carbon precursor thermosetting resin, and the adsorption enhancing agent, or it can take the form of granules. The forming mixture can be granulated, preferably by extruding noodles which are then broken up. More preferably granules are formed by breaking up a cured body preferably before carbonization.

The Carbon Precursor

According to this invention, by carbon precursor is meant a synthetic, polymeric carbon-containing substance that converts to continuous structure carbon on heating. Synthetic materials are utilized instead of natural materials because among other advantages, they yield more compositionally uniform and purer products. Non-polycyclic aromatic (or non-polynuclear) materials are utilized because polycyclic or polynuclear aromatic precursors are often difficult to handle, (the viscosity is often too high and they are difficult to mix, or they often vaporize before they can be carbonized and activated), especially in coating and forming operations, and can be toxic. For purposes of this invention, a synthetic carbon precursor, e.g. a synthetic resin is in the form of a solution or low viscosity liquid at ambient temperatures or capable of being liquefied by heating or other means is especially useful. Solid resins can be used in shaping activated carbon mixtures.

A carbon precursor is preferred over activated carbon particle coating because as a result of curing, carbonizing and activating, the carbon atoms are arranged in a continuous uninterrupted structure of random three dimensional graphitic platelets. The platelets have angstrom sized pores typically about 5 to about 50 angstroms for adsorption as distinguished from micron-size pores. Pores in several hundred micron size range can be present in the activated carbon, but they do not contribute to adsorption capacity.

Low viscosity carbon precursors (e.g., thermosetting resins) are preferred for coating applications because their low viscosity allows greater penetration of the carbon precursor into porous inorganic substrates. Typical resin viscosity ranges from about 50 to 1000 cps. Phenolic resins are most preferred due to their low viscosity, high carbon yield, high degree of cross-linking upon curing relative to other precursors, and low cost. The carbon precursor liquid used in the present method can include a single precursor material or a mixture of two or more precursor materials. Optionally, activated carbon can be added to the carbon precursor liquid to increase the adsorptive capability of the activated carbon structure.

Any high carbon yield resin can be used. By high carbon yield is meant that greater than about 10% of the starting weight of the resin is converted to carbon on carbonization. Phenolic and furan resins are the most suitable. One especially suitable furan liquid resin is Furcarb-LP from QO Chemicals Inc. Suitable phenolic resins are resole resin such as 43250 plyophen resin, and 43290 from Occidental Chemical Corporation, and Durite resole resin from Borden Chemical Company. Solid resins can be used in shaping the activated carbon. One especially suited solid resin is solid phenolic resin or novolak.

In the practice of this invention, a phenolic resin can also be made by reacting phenol with formaldehyde and any of the numerous curing agents as is known by those skilled in the art. Some typical curing agents are $NH_4OH$, NaOH, sodium carbonate, primary or secondary amines, formic, oxalic, sulfuric acids, etc.

The Adsorption-enhancing Additive

Several substances have been found to increase the adsorption capacity of activated carbon when they are added to the carbon precursors from which the activated carbon is derived.

In general, the substances found suitable as adsorption enhancing additives are sulfur, precipitated or sublimed, in particular fine sulfur, that is, sulfur having a particle size of −50 mesh, and preferably −100 mesh; phosphoric acid; and mineral, vegetable, and synthetic oils which are non-miscible with and non-chemically reactive with the carbon precursor.

It is preferred that the oil have a viscosity no greater than about 1000 poise, preferably no greater than about 500 poise, and most preferably no greater than about 200 poise. One of the many suited oils is supplied by 3 M under the name of 3 in 1 household oil.

Sulfur added as a particulate additive directly to the resin may not react with the resin during cure. Sulfur melts and reacts with the resin during carbonization. On activation, these compounds contribute to forming a highly adsorbent carbon. The activated carbon has sulfur-carbon compounds in the structure. The sulfur-carbon bonds are chemical bonds. FIG. 1 is a plot showing ESCA data for a sulfur-carbon product of the present invention. There is a characteristic peak at 165.9 eV. indicative of chemical bonding. This is in contrast to less stable physical bonds held together by Van-der-waals forces, as will be discussed in the examples that follow.

Phosphoric acid reacts with the precursor when the precursor is phenolic resin and accelerates the curing reaction. It is believed that the phosphorus compounds are integrated into the resin structure. Upon activation, a highly adsorbent carbon is formed with phosphorus-carbon compounds present in the carbon structure.

With the oils, the immiscible oil, does not take part in curing reactions. It is phase separated from the precursor. Since it is not integrated into the structure, the oil additive remains in a well-mixed but separate phase. During carbonization, the oil is removed by evaporation. The oil thus makes a much higher surface area of the cured resin available for reaction. During carbonization, the oil evaporates and the remaining high surface area carbon structure is activated to obtain highly adsorbent carbon.

Some useful oils are petroleum oils with molecular weights from about 250 to 1000, containing paraffinic and/or aromatic and/or alicyclic compounds. So called paraffinic oils composed primarily of paraffinic and alicyclic structures are preferred. These can contain additives such as rust inhibitors or oxidation inhibitors such as are commonly present in commercially available oils. One especially useful oil is 3 in 1 oil. Other useful oils are synthetic oils based on poly alpha olefins, esters, polyalkylene glycols, polybutenes, silicones, polyphenyl ether, CTFE oils, and other commercially available oils. Vegetable oils such as sunflower oil, sesame oil, peanut oil, etc. are also useful.

Depending on the form of activated carbon, certain of the substances are suitable as adsorption enhancing agents. For example, if a coating of activated carbon is to be formed on a substrate, sulfur and oil are suited. If the precursor is to be shaped into a body which is thereafter cured, carbonized, and activated, phosphoric acid, sulfur, and the oils are all suitable. The carbon precursor is combined with the adsorption enhancing agent. There is no restriction on how this is done as long as they are well mixed with other components in the coating or forming mixture.

For coating and most of the applications involving shaping, e.g. extrusion compositions, the modifier is mechanically mixed with the resin. For coating, the liquid containing the modifier is coated on the surfaces of the substrate.

The precursor-agent mixture especially is suitable for coating on a substrate and penetrating through to the porosity of the substrate. When coated onto a substrate, upon curing and carbonizing, a coating is produced that is physically interlocked within the interconnecting porosity of the substrate.

The coating is preferably a continuous uninterrupted activated carbon impregnated into the pores of the substrate. The coating can also be distributed over the outer surface of the substrate.

In one preferred embodiment, the adsorption enhancing agent is sulfur and the carbon precursor is a thermosetting resin such as phenolic resin, e.g. phenolic resole. In this embodiment, the preferred composition of coating mixture is about 0.1% to 25%, and preferably about 2% to 10% by weight sulfur with the balance being the thermosetting resin which is preferably phenolic resin e.g. phenolic resole.

Some especially suited substrate materials are ceramic, glass ceramic, glass, metal, and combinations thereof. By combinations is meant physical or chemical combinations, eg., mixtures, compounds, or composites. Molecular sieves, e.g. zeolites are also suitable substrate materials.

Some materials that are especially suited to the practice of the present invention, although it is to be understood that the invention is not limited to such, are those made of cordierite, mullite, clay, talc, zircon, zirconia, zirconates, zirconia-spinel, zeolites, magnesium alumino-silicates, spinel, alumina, silica, silicates, borides, alumino-silicates, eg., porcelains, lithium aluminosilicates, alumina silica, feldspar, titania, fused silica, nitrides, borides, carbides, eg., silicon carbide, silicon nitride, or mixtures of these. Especially useful materials are cordierite and/or mullite. Cordierite is preferred because its coefficient of thermal expansion is comparable to that of carbon, increasing the stability of the activated carbon body.

The invention is suitable for use with metal substrates. These substrates can be made of any sinterable metal or metal composition. Especially suited are iron group metal, chromium, and aluminum compositions, with the preferred iron group metal being iron. Especially preferred is Fe, Al, and Cr. For example, Fe5−20Al5−40Cr, and Fe7−10Al10−20Cr powders with other possible additions are especially suited. Some typical compositions of metal powders are disclosed in U.S. Pat. Nos. 4,992,233, 4,758,272, and 5,427,601, which are herein incorporated by reference as filed. U.S. Pat. No. 4,992,233 relates to methods of producing porous sintered bodies made from metal powder compositions of Fe and Al with optional additions of Sn, Cu, and Cr. U.S. Pat. No. 5,427,601 relates to porous sintered bodies having a composition consisting essentially of in percent by weight about 5 to about 40 chromium, about 2 to about 30 aluminum, 0 to about 5 of special metal, 0 to about 4 of rare earth oxide additive and the balance being iron group metal, and unavoidable impurities such as eg., Mn or Mo, with the preferred iron group metal being iron. When rare earth oxide is present, the special metal is at least one of Y, lanthanides, Zr, Hf, Ti, Si, alkaline earth metal, B, Cu, and Sn. When no rare earth oxide is present, the special metal is at least one of Y, lanthanides, Zr, Hf, Ti, Si, and B, with optional additions of alkaline earths, Cu, and Sn.

The substrate is preferably in the shape of a honeycomb having a matrix of thin porous walls which form a multiplicity of cells or channels extending between the ends of the honeycomb.

Generally honeycomb densities range from about 235 cells/cm$^2$ (1500 cells/in$^2$) to about 15 cells/cm$^2$ (100 cells/in$^2$). Examples of honeycombs produced by the process of the present invention, although it is to be understood that the invention is not limited to such, are those having about 94 cells/cm$^2$ (about 600 cells/in$^2$), or about 62 cells/cm$^2$ (about 400 cells/in$^2$) each having wall thicknesses of about 0.1 mm (4 mils). Wall (web) thicknesses range typically from about 0.1 to about 1.3 mm (about 4 to about 50 mils) for most applications and it is to be understood that the invention is not limited to these dimensions. Thicknesses of about 0.02–0.048 mm (1–2 mils) are possible with better equipment.

The external size and shape of the body is controlled by the application and is not limited to those described above. For example, other combinations of cell densities and wall thicknesses can be made.

The substrate can be fabricated in a number of ways. For example, a ceramic honeycomb with straight channels or cells is manufactured according to methods well known in the art.

The activated carbon body can be made by shaping a mixture of raw materials such as by extrusion followed by heat-treating. The preferred shape is a honeycomb. The wall porosity of the honeycomb is controlled by the raw materials used during the manufacture and the process conditions during fabrication. A burnout agent such as graphite, carbon powder, wood fibers, cellulose, etc. are typically used during extrusion which burns off during subsequent high temperature processing, leaving pores of the size determined by the size of the burnout agent particulates. Porosity can also be controlled by choosing appropriate raw materials which form porosity during sintering. Such a honeycomb is then impregnated with a carbon precursor material which is subsequently cured, carbonized, and the carbon activated. Upon curing and carbonizing, a coating is produced that is physically interlocked within the interconnecting porosity of the substrate. Impregnating substrates with carbon precursors followed by curing, carbonizing, and activating is described in U.S. Pat. No. 5,451,444 which is herein incorporated by reference as filed.

The carbon precursor and adsorption enhancing agent or modifier can be made into a mixture with a temporary organic binder and forming, (e.g. extrusion) aids, such as lubricants, surfactants, etc. and shaped into a form which can be cured, carbonized, and activated. The precursor and agent can be combined with fillers.

In a preferred embodiment, the activated carbon shaped adsorber can be made by shaping, e.g. extruding, a mixture of liquid or solid thermosetting resin as the carbon precursor, the agent, fillers, especially hydrophilic fillers, temporary organic binder, e.g. cellulose ethers, such as methylcellulose and/or its derivatives, and optionally forming aids such as lubricants, e.g. sodium stearate (soap). Liquid thermosetting resin is preferred with liquid phenolic resin, e.g. phenolic resole being especially preferred. Liquid such as phenolic resin, (e.g. phenolic resole) has a high viscosity e.g. 100–1000 cps. The shaped body is dried, and the resin is cured, carbonized, and activated to form the adsorber.

The Temporary Organic Binder

A temporary or fugitive binder is used to bind the precursor, agent, and fillers, and will be removed in the heat-treatments. A plasticizing organic binder contributes to the plasticity of the mixture for shaping into a body. The plasticizing organic binder according to the present invention refers to cellulose ether binders. Some typical cellulose ethers are methylcellulose and its derivatives such as ethylhydroxy ethylcellulose, hydroxybutylcellulose, hydroxybutyl methylcellulose, hydroxyethylcellulose, hydroxymethylcellulose, hydroxypropylcellulose, hydroxypropyl methylcellulose, hydroxyethyl methylcellulose, sodium carboxy methylcellulose, and mixtures thereof. Methylcellulose and/or methylcellulose derivatives are especially suited as organic binders in the practice of the present invention with methylcellulose, hydroxypropyl methylcellulose, or combinations of these being preferred. This can include a mixture of different types of methylcellulose and/or different types of hydroxypropyl methylcellulose. Some sources of methylcellulose and/or its derivatives are Methocel A4M, F4M, and F40M from Dow Chemical Co.

The Forming Aids

Forming aids are included as optional additions to the raw material mixture in amounts sufficient to enhance the lubricity of the mixture for ease in passing through the extruder and die, especially in solid resin mixtures. Some preferred extrusion aids are soaps, fatty acids such as oleic, linoleic acid, etc., polyoxyethylene stearate, etc. or combinations of these. Especially preferred is sodium stearate. Optimized amounts of extrusion aid(s) depend on the composition and binder, although generally extrusion aids make up no more than about 3% by weight of the mixture.

The Fillers

In these embodiments, for both liquid and solid resin systems, the filler must be hydrophilic in order to be easily wet by the liquids in the system. The fillers can be inorganic The fillers are most typically an oxygen-containing, e.g. oxide substance, and are therefore relatively inexpensive. Some especially suited fillers for the shaping mixture are described in abandoned U.S. Pat. application Ser. No. 08/395,224 filed Feb. 27, 1995. That application is herein incorporated by reference as filed.

The fillers can be fibrous. Fibrous fillers typically give higher strength and stiffness to a structure compared a particulate structure. According to this invention, by fibrous is meant a length of up to about 1 centimeter, and preferably up to about 500 micrometers. The diameter is up to about 500 micrometers, preferably up to about 100 micrometers, and most preferably up to about 10 micrometers.

Depending on whether the resin is liquid or solid, the types of fillers that must be used will vary.

Using either liquid or solid resin alone presents certain problems.

For example, liquid resin has a very low viscosity and requires some type of filler to be extrudable. Elemental carbon fillers may be used to form an extrudable batch but on carbonization such structures have poor strength since the carbon filler does not bond to the resin.

For liquid resin systems, it was found that addition of a hydrophilic carbonizable (essentially organic) filler, with or without a hydrophobic organic filler, (preferably fibrous), is necessary to form a good honeycomb extrusion. Hydrophilic organic fibrous filler allows the liquid resin to infiltrate the fibrous structure at high loading levels. The mixture has good rigidity and is extruded into a honeycomb shape easily and maintains the shape on carbonization. Inorganic hydrophilic fillers preferably with a fibrous morphology can also be used with liquid resins in addition to the carbonizable filler. Mixtures of organic and inorganic fillers result in optimized strength and rigidity of the final carbon product, as well as minimization of cost. Inorganic fillers also minimize shrinkage and warpage.

Both natural and synthetic carbonizable fillers can be used. Some natural materials are soft woods, e.g. pine, spruce, redwood, etc., hardwoods e.g. ash, beech, birch, maple, oak, etc., sawdust, shell fibers e.g. ground almond shell, coconut shell, apricot pit shell, peanut shell, pecan shell, walnut shell, etc., cotton fibers e.g. cotton flock, cotton fabric, cellulose fibers, cotton seed fiber, chopped vegetable fibers for example, hemp, coconut fiber, jute, sisal, and other materials such as corn cobs, citrus pulp (dried), soybean meal, peat moss, wheat straw, wool fibers, corn, potato, rice, and tapioca etc. Some synthetic materials are regenerated cellulose, rayon fabric, cellophane, etc.

Some examples of carbonizable fillers that are especially suited for liquid resins are cellulose, cotton, wood, and sisal, or combinations of these, all of which are preferably in the form of fibers.

One especially suited carbonizable fiber filler is cellulose fiber as supplied by International Filler Corporation, North Tonowanda, N.Y. This material has the following sieve analysis: 1–2% on 40 mesh (420 micrometers), 90–95% thru 100 mesh (149 micrometers), and 55–60% thru 200 mesh (74 micrometer).

Activated carbon can also be used as a filler.

Some inorganic fillers that can be used are oxygen containing minerals such as clays, zeolites, talc, etc., carbonates, such as calcium carbonate, aluminosilicates such as kaolin (an aluminosilicate clay), flyash (an aluminosilicate ash obtained after coal firing in power plants), silicates, e.g. wollastonite (calcium metasilicate), titanates, zirconates, zirconia, zirconia spinel, magnesium aluminum silicates, mullite, alumina, alumina trihydrate, spinel, feldspar, attapulgites, and aluminosilicate fibers, cordierite powder, etc.

Some examples of especially suited inorganic fillers are cordierite powder, talcs, clays, and aluminosilicate fibers such as provided by Carborundum Co. Niagara Falls, N.Y. under the name of Fiberfax, and combinations of these. Fiberfax aluminosilicate fibers measure about 2–6 micrometers in diameter and about 20–50 micrometers in length.

Hydrophobic organic fillers provide additional support to the shaped structure and introduce wall porosity on carbonization because in general they leave very little carbon residue. Some hydrophobic organic fillers are polyacrylonitrile fibers, polyester fibers (flock), nylon fibers, polypropylene fibers (flock) or powder, acrylic fibers or powder, aramid fibers, polyvinyl alcohol, etc.

In general the particle or fiber size of the fillers must be such that they will be able to pass through the respective die in forming thin walled structures such as honeycombs. For example, for extrusion of a 0.15 mm (6 mil) wall honeycomb through a die that has 152 micrometer openings, up to about 420 micrometer long cellulose fibers have been found to work well. This example is merely illustrative and it is to be understood that the invention is not limited to specific size fillers for specific size structures.

For both solid and liquid resins, the filler normally makes up about 2% to 95 wt. % of the mixture (excluding any water that is added). The weight ratio of filler to resin is generally about 0.2 to 1 to 4.0 to 1, although this can vary.

It is preferred, especially with liquid thermosetting resin, that the level of adsorption enhancing agent in the mixture be in wt. % about 0.1% to 20% sulfur, 0 to about 10% oil, and 0 to about 5% phosphoric acid with about 5% to 15% sulfur and about 0.5% to about 3% oil being especially preferred.

Some advantageous mixture compositions with liquid thermosetting resins are given below in weight percents.

One advantageous mixture is made up of about 0.1% to 20% sulfur, 0 to 5% phosphoric acid, 0 to 7% oil, about 2% to 95% fillers, about 0.5% to 10% cellulose ether temporary organic binder, about 0 to about 2% lubricant, with the balance being phenolic resin.

Another advantageous mixture is made up of about 0.1% to 20% sulfur, 0 to 5% phosphoric acid, 0 to 7% oil, about 5% to 50% cellulose fibers, 0 to about 15% hydrophobic organic filler, about 2% to 10% organic binder which can be methylcellulose, and/or its derivatives, about 0% to about 2% lubricant, and the balance being phenolic resole.

Still another advantageous mixture is made up of about 5% to 15% sulfur, about 0.5% to 3% oil, about 15% to 30% filler which can be cellulose fibers, and/or wood fibers, about 5% to 20% cordierite, about 2% to 8% organic binder which can be methylcellulose, and/or its derivatives, about 0.5% to 3% sodium stearate lubricant, and the balance being phenolic resole.

Additionally, the above-described preferred adsorption enhancing agents for liquid thermosetting resins can be used in any of the mixtures given below in weight percent:

1) about 2% to 50% cellulose fibers or wood fibers, about 2% to 10% organic binder which is typically methylcellulose, and/or methylcellulose derivatives, 0% to about 15% hydrophobic organic filler such as polyester flock, polypropylene flock or powder, acrylic fibers or powders, etc, 0% to about 2% lubricant, e.g. soap, and the balance being phenolic resole; or 2) 20% to 35% cellulose fibers, or wood fibers, about 2% to 10% and more typically about 3% to 7% organic binder which can be methylcellulose, and/or its derivatives, 0% to about 2.0% lubricant, e.g., soap, and the balance being phenolic resole; or 3) Compositions 1 and 2 can include additionally about 5% to 60% and more advantageously about 10% to 30% cordierite powder filler; or 4) about 2% to 50% cellulose fibers or wood fibers, about 30% to 45% inorganic filler which can be any one or combination of cordierite powder, clay, and talc, about 2% to 10% organic binder which can be methylcellulose, and/or its derivatives, 0% to about 2% lubricant, e.g. soap, and the balance being phenolic resole.

5) about 9% to 25%, and most typically about 10% to 15% cellulose fibers, about 30% to 45% inorganic filler which can be clay, e.g. hydrite clay, talc, or cordierite powder, or combinations of these, about 2% to 10% organic binder which can be methylcellulose, and/or its derivatives, about 0% to 2.0%, e.g. soap, and the balance being phenolic resole.

Such compositions are advantageous for liquid resin systems because the carbonizable hydrophilic materials such as cellulose fibers soak in the liquid resin and form a stiff batch which can be extruded. Additionally on carbonization, they yield carbon which results in additional adsorption capacity. The inorganic filler reduces shrinkage on carbonization and imparts strength and stiffness and reduces batch cost.

Solid phenolic resin (novolak) is solid at room temperature, but melts at about 60–75° C. The cure temperature is, however about 150° C. As the extruded product is heated to cure the resin at about 150° C., the structure collapses at about 75° C.

For solid systems, the filler stiffens the structure during the softening of the resin before cure. The filler can be either a carbonizable or an inorganic material. A combination of inorganic and carbonizable material is preferred. Hydrophobic organic fillers are also desirable in solid resin mixtures. The advantages of carbonizable and hydrophobic organic fillers have been previously discussed.

The preferred solid resin is novolak.

The carbonizable and inorganic fillers are the same as described above for liquid resins. For solid resins, fibrous inorganic fillers are especially useful.

For solid thermosetting resins, it is preferred that the level of adsorption enhancing agent in the mixture be in wt. % about 0.1% to 20% sulfur, and 0 to about 10% oil, with about 5% to 15% sulfur and about 0.5% to about 3% oil being especially preferred.

Some advantageous mixture compositions with solid thermosetting resins and the above adsorption enhancing agents are given below in weight percents.

1) about 2% to 50% cellulose fiber, about 5% to 50% filler which can be cordierite powder, and/or talc, 0 to about 15% hydrophobic organic filler, about 2% to 10% temporary organic binder which can be methylcellulose, and or its derivatives, 0% to about 2% lubricant, and the balance being novolak;

2) about 5% to 50% aluminosilicate fiber, about 5% to 50% filler which can be any one or combination of cellulose fibers, cotton fibers, wood fibers, sisal fibers, about 2% to 10% temporary organic binder which can be methylcellulose and/or its derivatives, about 1% to about 3% lubricant, and the balance being novolak;

3) about 2% to 50% cellulose fibers or wood fibers, about 5% to 50% inorganic filler which can be cordierite powder, and/or talc, about 2% to 10%, and more typically about 5% to 10% organic binder which can be methylcellulose, and/or its derivatives, 0% to about 15% hydrophobic organic filler such as polyester flock, polypropylene flock or powder, acrylic fibers or powders, etc, 0% to about 2% lubricant, e.g. soap, and the balance being novolak;

4) about 8% to 22%, and more typically about 8% to 12% cellulose fibers or wood fibers, about 15% to 30% inorganic filler which can be cordierite powder and/or talc, about 2% to 10% organic binder which can be methylcellulose and/or its derivatives, 0% to 3%, and more typically about 0.5% to about 2% lubricant, e.g. soap, and the balance being novolak;

5) about 5% to 50% aluminosilicate fiber, about 5% to 50% carbonizable filler, about 2% to 10% organic binder which can be methylcellulose, and/or its derivatives, about 1% to about 3% lubricant, and the balance being novolak;

6) about 8% to 15% aluminosilicate fiber, about 5% to 20% hydrophobic organic filler, e.g. polyester flock, about 2% to 10% organic binder which can be methylcellulose and/or its derivatives, about 1% to about 3% lubricant, e.g. soap, and the balance being novolak.

The mixture components are blended. Most typically dry components are blended after which they are blended with the liquid components in a muller. For solid resin powder such as novolak and solid modifier such as sulfur, the resin and sulfur are dry mixed before the other components are mixed in. Phosphoric acid and the oils, can be added directly to the forming batch. Water is added if necessary to make the mixture handleable for extrusion. The mixture is then extruded. Conventional extrusion equipment can be used. For example, the extrusion can be done using a hydraulic ram extrusion press, or a two stage de-airing single auger extruder, or a twin screw mixer with a die assembly attached to the discharge end. In the latter, the proper screw elements are chosen according to material and other process conditions in order to build up sufficient pressure to force the batch material through the die.

The shaped bodies are then dried. Drying can be done in air at room temperature-80° C., or in dielectric or microwave dryers.

The dried bodies are then cured in the shaped form by heating under the specific temperature and time conditions required for the specific resin. The curing can be done in a conventional oven. Standard curing conditions can be found in the manufacturer's literature. For example, for phenolic resole 43290 from Occidental Chemical Co. the body is heated in air to about 140–155° C. The final temperature is attained slowly so that the body does not distort. For example, the body is first heated to about 90° C.–100° C., then to about 120° C.–130° C. and held at this temperature for about 1–2 hours. It is then heated to about 140° C.–155° C. and held for about 30 minutes-2 hours for final cure. Curing can also be done in a dielectric or microwave oven.

After the shaping step, and preferably after the curing step, but before the carbonization step, the shaped body can be granulated. The resulting granules can then be processed as would the shaped body to obtain activated carbon.

The carbonization is carried out by heating the body in an inert or reducing atmosphere such as nitrogen or argon or forming gas. Forming gas is a mixture of nitrogen and hydrogen. Typical mixtures by volume are 92:8 or 94:6 $N_2:H_2$, although any mixtures can be used. Carbonization temperatures are about 600° C.–1000° C. or more typically about 700–1000° C. for a length of time of usually about 1–20 hours. While the body is in the temperature range of about 300–600° C., the fugitive materials vaporize. During carbonization low molecular weight compounds separate out and carbon atoms form graphitic structures. For example for phenolic resole resin 43290 from Occidental Chemical Co. and Furan Furcarb resin from QO Chemicals, carbonization is done by heating at a rate of about 15° C./hr in $N_2$. The temperature is held at about 900° C. for about 6–10 hours to complete the carbonization. The temperature is then reduced to 25° C. at a cooling rate of about 150° C./hr. On carbonization, the body contains random three dimensional oriented graphitic platelets with amorphous carbon between the platelets.

The activation is done by partially oxidizing in a suitable oxidant such as $CO_2$, steam, air, or a combination of these, etc. Activation can be carried out at temperatures between about 700° C.–1000° C. Activation conditions depend on type and amount of resin, flow rate of gas, etc. For example for phenolic resole and Furcab resins activation conditions are at about 900° C. for about 1–5 hours in $CO_2$ at a flow rate of about 14.2 l/hr. (about 0.5 CFH (ft.$^3$/hr.)). The partial oxidation during activation causes the removal of the amorphous carbon and the formation of molecular size porosity between the graphitic platelets. This porosity and the graphitic platelets impart the adsorption characteristics to the resulting activated carbon body. As with activated carbon coated monoliths, the activation conditions can be determined according to the pore size that is desired in the adsorber.

The activated carbon bodies of the present invention, in both the form of an activated carbon coating on a substrate, and in a shaped activated carbon body, especially honeycombs, are especially suited for adsorption applications. A workstream is passed into the body, through the inlet end, one or more contaminants or components are adsorbed the activated carbon, and thereafter, the purified workstream passes out of the body through the outlet end.

To more fully illustrate the invention, the following non-limiting examples are presented. All parts, portions, and percentages are on a weight basis unless otherwise stated.

EXAMPLE 1

To a phenolic resole resin having a viscosity of about 100 cp, about 5% of fine sulfur powder was added. Phenolic resin was from Georgia Pacific Co. The resin was then coated onto a porous cordierite honeycomb with a porosity of about 48%. The resin was then cured by first drying at about 90° C. and heating to about 125° C. and holding for about 30 minutes and then heating to about 150° C. and holding for about 1 hour. An identical sample was made from the resin without adding the sulfur powder. Both the samples were then heated to about 900° C. in nitrogen for about 6 hours for carbonization and then activated in carbon dioxide for about 2 hours. The adsorption capacity was measured for a 1500 ppm butane-containing nitrogen stream at about 4000 cc/min. flow rate for the 2.54 cm. (1") and 3.8 cm (1.5") long samples. The sample without sulfur had an adsorption capacity of about 132 mg compared to about 181 mg for the sample coated with the sulfur containing resin.

EXAMPLE 2

A composition containing about 56.6% Durite resole resin from Borden Chemical Co., about 22.6% cellulose fiber from International Filler Co., North Tonowanda, N.Y., about 15.1% finely ground cordierite powder, about 4.7% methylcellulose binder and about 1% sodium stearate (SAN) lubricant was extruded into a honeycomb shape with about 62 cells/cm$^2$ (400 cells/in$^2$) geometry and about 0.15 mm (6 mil) wall thickness. Two other identical compositions but one containing about 5% and the other containing about containing about 10% fine sulfur powder were extruded into the same geometry. All the honeycombs were then cured, carbonized, and activated according to the schedule given above. The adsorption capacity was measured on the standard 2.54 cm. (1") diameter and 3.8 cm (1.5") long samples according to the method given above. The adsorption capacity of the non-sulfur containing composition was 374 mg. The adsorption capacity of the 5% sulfur containing composition was about 570 mg, and that of the 10% sulfur containing composition was about 512 mg. There is thus a substantial increase in adsorption capacity due to addition of sulfur to the resin.

EXAMPLE 3

The phenolic resole resin composition of Example 2 was used except that the cellulose fibers were replaced with wood fibers from American Wood Fibers, Schofield, Wis. The composition was extruded with and without sulfur at about 5% and 10% as in Example 2. The honeycomb composition without sulfur had an adsorption capacity of about 430 mg compared to about 546 mg and 567 mg for compositions containing about 5% and 10% sulfur respectively.

In all three examples, significant increase in adsorption capacity is clearly seen.

EXAMPLE 4

The non-sulfur containing compositions of Examples 2 and 3 were extruded with addition of about 2% phosphoric acid. The honeycombs were then cured, carbonized, and activated and the adsorption capacities were measured. The adsorption capacities were about 432 and about 575 mg. respectively for cellulose fiber and wood fiber containing compositions. These adsorption capacities are significantly higher than the equivalent compositions without the phosphoric acid, which had capacities of about 364 mg and about 430 mg respectively.

EXAMPLE 5

A resin composition containing about 56.6% phenolic resin from Borden Chemical Co., about 22.6% cellulose fibers from International Filler Co., Tonowanda, N.Y., about 15.1% cordierite grog, about 4.7% methocel and about 1% sodium stearate (SAN) as a lubricant was extruded into a honeycomb structures with a 62 cells/cm$^2$ (400 cells/in$^2$) geometry and a wall thickness of about 0.15 mm (6 mil). The honeycombs thus extruded were cured, carbonized, and activated according to the previously given schedules. The adsorption capacity of the standard activated sample (2.54 cm. (1") diameter and about 3.8 cm. (1.5") long) was about 374 mg. in a 4000 cc/min. flow rate of nitrogen gas carrying about 1500 ppm butane.

EXAMPLE 6

The same components as in Example 2 were used except the resin was pre-mixed with about 2% oil from 3M Co. commonly available as a lubricant. Honeycombs were extruded and processed as in the previous examples. The adsorption capacity of the standard sized honeycomb activated under the same conditions was about 472 mg, which is substantially higher than that obtained in Example 2 with a composition that does not contain the oil. The adsorption capacity of this non-oil composition was about 374 mg.

EXAMPLE 7

The procedure of Example 6 was repeated but with about 5% oil pre-mixed with the resin. The adsorption capacity of the standard honeycomb was measured as about 498 mg.

The above examples show that mixing of a non-miscible liquid which does not chemically react with the resin can substantially increase the performance of the activated carbon honeycombs.

EXAMPLE 8

The composition of Example 3 containing wood fibers was mixed with about 1% oil and about 5% sulfur and was then extruded, cured, carbonized, and activated according to the schedules given earlier. The adsorption capacity of the samples was measured in a stream of about 4000 cc/min nitrogen containing about 1500 ppm butane. The adsorption capacity was about 582 mg. The adsorption capacity is substantially higher than the 430 mg. for the composition containing no oil or sulfur and also higher than the composition containing about 5% sulfur which had a capacity of about 546 mg.

EXAMPLE 9

The composition of Example 3 containing wood fibers was mixed with about 1% oil and about 10% sulfur and then processed as described in Example 8. The adsorption capacity for this sample was about 618 mg. which is substantially higher than the 567 mg. for a composition containing 10% sulfur alone.

EXAMPLE 10

The composition of Example 3 containing wood fibers was mixed with about 1% oil, about 10% sulfur, about 2% phosphoric acid and processed as before. This sample had an adsorption capacity of about 533 mg. This same composition without the adsorption enhancing agents had an adsorption capacity of about 430 mg. The mixed agent composition thus results in a higher adsorption capacity activated carbon.

The above examples show that a mixture of modifiers of oil, sulfur, and phosphoric acid result in higher adsorption capacities than the modifiers used alone.

EXAMPLE 11

A composition containing about 49% phenolic resole resin, about 20% wood fibers, about 12% fine cordierite powder (grog), about 9.8% sulfur, about 2% phosphoric acid, and about 2.5% flock (hydrophobic organic filler from polyester fibers from International Filler Corp., North Tonowanda, N.Y., about 1% sodium stearate (SAN) as lubricant, and about 3.7% methylcellulose as binder was extruded, cured, carbonized, and activated as described before. The adsorption capacity of the standard size sample in this case was about 740 mg for the 1500 mg butane test.

EXAMPLE 12

The composition of Example 11 was used but with replacement of cordierite grog with talc. The experiment was repeated with extrusion of honeycombs followed by curing, carbonization, and activation. The resulting standard size sample had an adsorption capacity of about 720 mg, which is about the same as that of Example 11.

EXAMPLE 13

Figure 2:
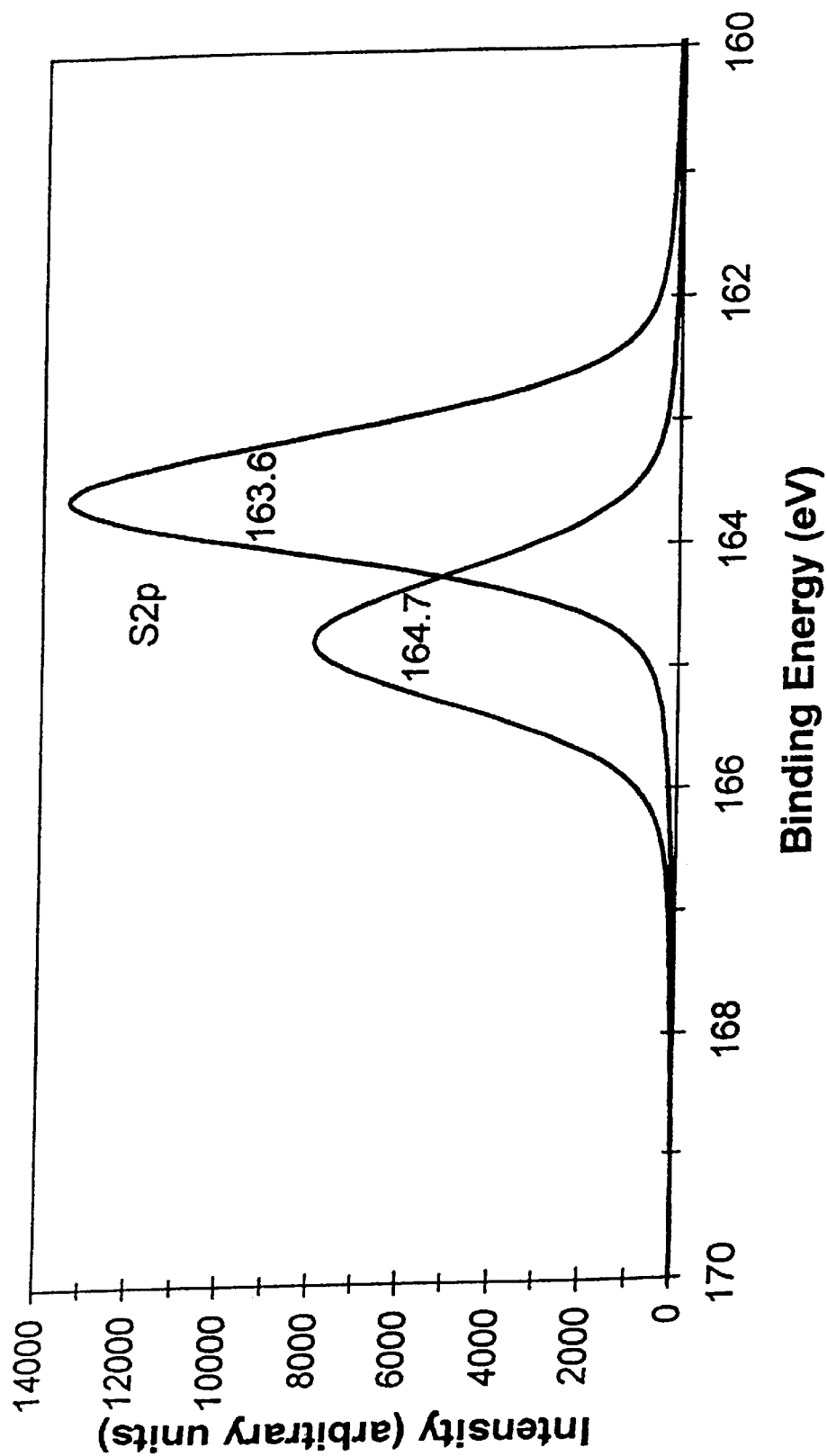
FIG. 2 is a plot depicting ESCA data for a comparative example.

Elemental sulfur was mixed with phenolic resin, and the mixture was heated to about 900° C. to duplicate the temperatures that such material is exposed to in the practice of this invention. The ESCA data analysis of the resulting sulfur-carbon material is shown as FIG. 1. A peak at 165.9 eV indicates that a stable chemical bond has formed. For purposes of comparison, elemental sulfur was mixed with already formed activated carbon and heated to about 150° C. for about 2 hours to duplicate a "physical mixing" of sulfur and carbon. The ESCA data analysis of the resulting "physically mixed" material is shown as FIG. 2. As can be seen, the graph is different from FIG. 1, with the absence of the peak at 165.9 eV that is characteristic of a chemical bond between sulfur and carbon. Therefore it can be seen that mere physical mixing of carbon and sulfur does not give a product similar to the one obtained by mixing of a thermosetting resin carbon precursor with sulfur and then carrying out a high temperature reaction.

EXAMPLE 14

About 5 g of chrysene, a polycyclic aromatic compound, were mixed with about 1.66 g of solid sulfur powder and heated in argon to about 350° C. and held for about 5 hours. The material was further heated to about 550° C. and held for about 2 hours at that temperature. On cooling, it was found that there was no material in the reaction vessel. This happens because the material volatilizes out of the vessel. This indicates that polycyclic aromatic sources of carbon are not feasible in practicing the present invention.

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. A method of making an activated carbon body, the method consisting essentially of:
   a) forming a mixture consisting essentially of:
      a synthetic non-polycyclic aromatic carbon precursor, wherein said non-polycyclic aromatic carbon precursor is a thermosetting resin;
      an adsorption-enhancing additive containing in combination sulfur and an oil which is non-miscible and non-reactive with said thermosetting resin;
      an organic binder;
      a forming aid;
      a filler;
   b) shaping said mixture into a body;
   c) curing said thermosetting resin;
   d) carbonizing said cured thermosetting resin; and,
   e) activating the carbonized thermosetting resin to produce a shaped body of activated carbon, wherein a chemical bond between carbon and sulfur is formed and the activated carbon with sulfur is characterized by a peak at 165.9 eV on analysis by Electron Spectroscopy for Chemical Analysis.

2. The method of claim 1 wherein said thermosetting resin is a liquid phenolic resin.

3. The method of claim 2 wherein said adsorption-enhancing additive contains about 5–15 wt. % sulfur and about 0.5–3 wt. % oil.

4. The method of claim 2 wherein said adsorption-enhancing additive further contains phosphoric acid in combination with said sulfur and oil.

5. The method of claim 4 wherein said adsorption-enhancing additive contains about 0.1–20 wt. % sulfur, about 0–10 wt. % oil and about 0–5 wt. % phosphoric acid.

6. The method of claim 4 wherein said mixture consists essentially of:
   0.1–20 wt. % sulfur;
   0–7 wt. % oil;
   0–5 wt. % phosphoric acid;
   0.5–10 wt. % cellulose ether organic binder;
   0–2 wt. % lubricant forming aid;
   2–95 wt. % hydrophilic filler;
   with the balance being liquid phenolic resin.

7. The method of claim 6 wherein said mixture consists essentially of:

0.1–20 wt. % sulfur;
0–7 wt. % oil;
0–5 wt. % phosphoric acid;
2–10 wt. % cellulose ether organic binder selected from the group consisting of methylcellulose, methylcellulose derivatives, and combinations thereof;
0–2 wt. % lubricant forming aid;
5–50 wt. % cellulose fibers;
0–15 wt. % hydrophobic organic filler;
with the balance being liquid phenolic resin.

8. The method of claim 3 wherein said mixture consists essentially of:
5–15 wt. % sulfur;
0.5–3 wt. % oil;
2–8 wt. % cellulose ether organic binder selected from the group consisting of methylcellulose, methylcellulose derivatives, and combinations thereof;
0.5–2 wt. % sodium stearate lubricant forming aid;
15–30 wt. % filler selected from the group consisting of cellulose fibers, wood fibers, and combinations thereof;
5–20 wt. % cordierite;
with the balance being liquid phenolic resin.

9. The method of claim 1 wherein said thermosetting resin is a novolak.

10. The method of claim 9 wherein the mixture consists essentially of:
5–15 wt. % sulfur,
0.5–3 wt. % oil,
2–50 wt. % cellulose fiber,
5–50 wt. % filler selected from the group consisting of cordierite powder, talc, and combinations thereof,
0–15 wt. % hydrophobic organic filler,
2–10 wt. % temporary organic binder selected from the group consisting of methylcellulose, methylcellulose derivatives, and combinations thereof,
0–2 wt. % lubricant,
and the balance being novolak.

11. A method of claim 9 wherein the composition consists essentially of
5–15 wt. % sulfur,
0.5–3 wt. % oil,
5–50 wt. % aluminosilicate fiber,
5–50 wt. % filler selected from the group consisting of cellulose fibers, cotton fibers, wood fibers, sisal fibers, and combinations thereof,
2–10 wt. % temporary organic binder selected from the group consisting of methylcellulose, methylcellulose derivatives, and combinations thereof,
1–3 wt. % lubricant,
and the balance being novolak.

12. A method of making an activated carbon body, the method consisting essentially of:
a) providing an inorganic substrate;
b) forming a mixture consisting essentially of:
a synthetic non-polycyclic aromatic carbon precursor, wherein said non-polycyclic aromatic carbon precursor is a thermosetting resin;
an adsorption-enhancing additive containing in combination sulfur and an oil which is non-miscible and non-reactive with said thermosetting resin;
c) contacting said inorganic substrate with said mixture, such that said mixture coats said inorganic substrate;
d) curing said thermosetting resin;
e) carbonizing said cured thermosetting resin; and,
f) activating the carbonized thermosetting resin to produce a shaped body of activated carbon, wherein a chemical bond between carbon and sulfur is formed and the activated carbon with sulfur is characterized by a peak at 165.9 eV on analysis by Electron Spectroscopy for Chemical Analysis.

13. The method of claim 12 wherein said thermosetting resin is phenolic resin.

* * * * *